United States Patent
Catherin

[15] 3,635,562
[45] Jan. 18, 1972

[54] OPTICAL INTERFEROMETER FOR DETECTION OF SMALL DISPLACEMENTS

[72] Inventor: Jean-Michel Catherin, Savigny-sur-Orge, France

[73] Assignee: Compagnie Generale d'Electricite, Paris, France

[22] Filed: Nov. 12, 1968

[21] Appl. No.: 775,069

[52] U.S. Cl. .............................................. 356/112, 250/199
[51] Int. Cl. .......................................................... G01b 9/02
[58] Field of Search ....................... 356/106, 112; 331/94.5; 179/121; 250/199

[56] References Cited

UNITED STATES PATENTS

| 3,433,959 | 3/1969 | Atwood et al. | 250/199 |
| 2,948,152 | 8/1960 | Meyer | 356/106 X |
| 3,170,122 | 2/1965 | Bennett | 331/94.5 |
| 3,395,367 | 7/1968 | Bell et al. | 356/106 X |
| 3,470,329 | 9/1969 | Young | 356/112 X |

FOREIGN PATENTS OR APPLICATIONS 1,068,054  5/1967  Great Britain .......................... 356/112

OTHER PUBLICATIONS

Bruce, C. F. " On Automatic Parallelism Control in a Scanning Fabrey–Perot Interferometer." Applied Optics, Vol. 5 No. 9, Sept. 1966, p. 1447–1452.

Primary Examiner—Ronald L. Wibert
Assistant Examiner—T. Major
Attorney—Sughrue, Rothwell, Mion, Zinn & Macpeak

[57] ABSTRACT

An optical interferometer for detecting small displacements. Two mirrors form a Fabry-Perot cavity. One mirror is mounted to be subject to movement by external displacement forces. The other mirror is subjected to feedback control to reduce low-frequency variations in length of the laser cavity.

8 Claims, 6 Drawing Figures

INVENTOR
JEAN-MICHEL CATHERIN

ATTORNEYS

OPTICAL INTERFEROMETER FOR DETECTION OF SMALL DISPLACEMENTS

BACKGROUND OF THE INVENTION

1. Field of the Invention

The present invention relates to the detection and measurement of small displacements by optical interferometry, and more particularly, but not exclusively, to microphones having very high sensitivity when these displacements are of vibratory nature.

2. Description of the Prior Art

It is known to measure distances by means of multiple-wave optical interferometers, such as cavities of the Fabry-Perot type, which consist of two parallel semireflecting mirrors. The measurement error may be made very much smaller than the wavelength of the monochromatic light employed. With regard more particularly to the detection of small displacements which may be of a vibratory nature, French Pat. No. 1,484,711, taken out on the 7th Apr. 1964, by the present applicants, describes a laser situated between two mirrors, one of which is firmly attached to a member which receives the vibrations to be detected. The small displacements of this mirror produce proportional variations of the frequency of the light wave emitted by the said laser, which variations are detected by causing this wave to beat with another light wave emitted by an auxiliary reference laser. The device also comprises a loop for servocontrol of the mean position of the vibrating mirror with the aid of a transducer. To the transducer are transmitted only those components of the output signal which are of much lower frequency than the displacements detected, accomplished by means of a frequency discriminator and other elements such as, for example, a low-pass filter. It is sometimes troublesome thus to disturb the operation of a laser, the adjustment of which is always a delicate matter.

SUMMARY OF THE INVENTION

The present invention accordingly relates particularly to a device for detecting small displacements, including a source of monochromatic light cooperating with an assembly of two parallel mirrors forming a resonating cavity of the Fabry-Perot type. One of the mirrors is fixed and the other is suspended by a flexible suspension and undergoes the displacements. A detector is arranged for the light issuing from the cavity, the intensity of which light depends upon the distance L between the said two mirrors. The device is distinguished particularly by the fact that the said cavity is separated from the said source and by a transducer which influences the distance D between the nonsuspended mirror and the said suspension. The transducer is controlled by the detector in such manner as to produce a followup tending to lessen the variations of the said distance L which are produced by the said displacements, regardless of the frequency of these displacements.

DESCRIPTION OF THE PREFERRED EMBODIMENTS

Figure 1:
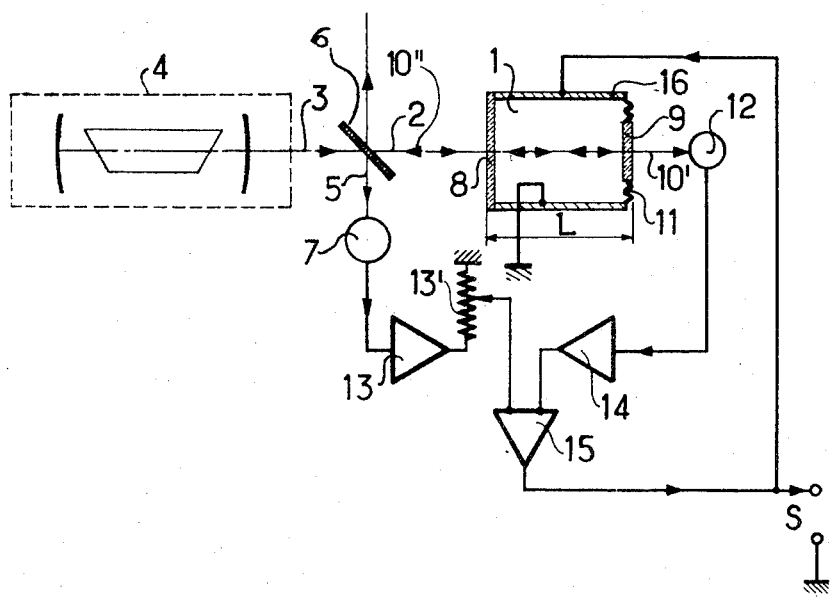
FIG. 1 is a general diagram of the device according to the invention.
Figure 2:
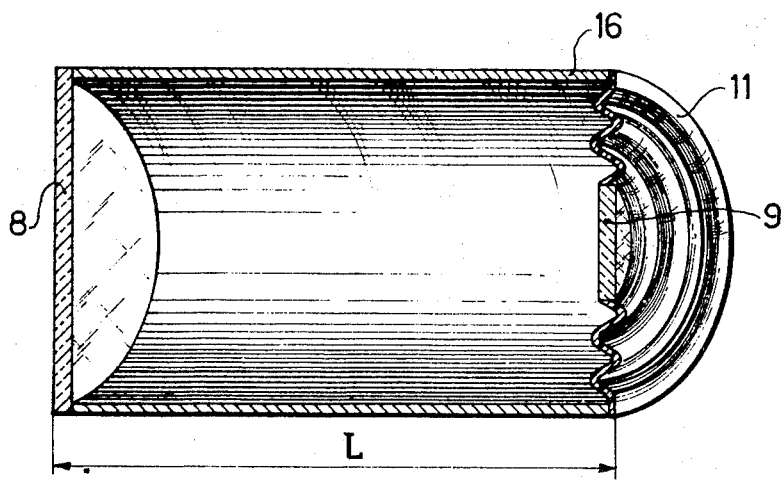
FIG. 2 is a diametral sectional view of the Fabry-Perot cavity of the said device, which cavity will hereinafter be simply referred to as the F.P. cavity.

FIG. 1 illustrates an F.P. cavity which receives a portion 2 of a beam 3 emitted by a laser 4. The other portion 5 of the beam 3 is deflected by a semitransparent strip 6 on to a photosensitive cell 7.

If the luminous power emitted by the laser 4 is $I_3$, the luminous powers $I_2$ and $I_5$ of the up 2 and 5 are proportional to the coefficients of reflection and of transmission of the strip 6, which are constant for a given position of the strip.

The beam 2 entering the cavity 1 undergoes therein a series of reflections on the semitransparent mirrors 8 and 9, whereby there are finally set up a "transmitted" beam 10' and a "reflected" beam 10'', which is thereafter again reflected on the strip 6.

The mirror 9 is mounted on a flexible suspension 11, which enables it to move parallel to itself. It is to the said mirror 9 that the displacements to be detected are applied, these displacements only causing in principle variations of the distance L between the mirrors 8 and 9 which are very much less than one quarter of the wavelength of the light emitted by the laser 4. When such a variation occurs, the power $I_{10'}$ of the transmitted beam 10' also undergoes a variation, which is detected by the photosensitive cell 12 which receives the beam 10''. It is obvious that the cell 12 could just as well receive the reflected beam 10'', the power of which undergoes an equivalent variation. Indeed, one of the properties of the F.P. cavity is that all the power introduced in the cavity (disregarding the losses due to absorption in the ambient medium and in the mirrors 8 and 9) appears at the output resolved into two parts, one of which is "transmitted" and the other "reflected," the sum of these two energies $I_{10'}$ and $I_{10''}$ therefore necessarily remaining approximately equal to the constant input power $I_2$.

The use of the reflected beam 10'' instead of the transmitted beam 10' is advantageous if the device according to the invention is employed as a microphone, because it is then desirable that the obstacle constituted by the cell 12 should not be positioned in the path of the sound waves travelling towards the mirror 9.

The signals supplied by the cells 7 and 12 are amplified at 13 and 14 and applied to a differential amplifier 15.

The gains of these amplifiers are so chosen that, in the absence of displacement of the movable mirror 9, the output signal of the device according to the invention is zero. This differential arrangement, which comprises on the one hand a measuring circuit consisting of the cell 7 and the amplifier 13, then permits compensation for certain errors (deviations), the cells 7 and 12, which are identical, receiving the same light under like conditions. More particularly, the balance is not affected by a variation of the power of the laser 4. Under these conditions, in the presence of a displacement of the mirror 9, the output signal is proportional thereto. For this purpose, it is also necessary to choose a position in the neighborhood of an appropriate point of the curve giving the variation of the power $I_{10'}$, issuing from the cavity as a function of the distance L between the mirrors 8 and 9, so as to describe only a portion of this curve which is comparable to a section of a straight line having a slope different from zero, which means that the variations of L are very small and limits a priori the dynamic range of the device.

It is known that the curve in question is not monotonous, since it consists of a regular series of peaks spaced apart by a half of a wavelength. It has already been stated that the variations of the distance L are small in relation to one quarter of the wavelength of the light employed. In the frequent case in which the displacements of the mirror 9 are greater than one quarter of this wavelength, the variations of L are reduced below this value, in accordance with an important feature of the invention, by means of a followup loop. The latter comprises, in addition to the members already mentioned, a transducer which influences the distance between the mirror 8 and the diaphragm 11, and which is controlled by the output signal.

In the described example, the said transducer, which may be of any known type, notably of the magnetostrictive type, is a piezoelectric ceramic element 16 which connects the mirror 8 to the diaphragm 11 and which is metallized on both faces, the external metallization receiving the output signal. The latter thus controls the distance L, which in turn determines the intensity $I_{10'}$ of the transmitted beam and the output signals of the cell 12 and amplifiers 14 and 15, the whole assembly constituting the aforesaid followup loop, which tends to maintain constant the distance L. The adjustment of the mean value of the distance L is obtained by means of the same followup loop and results from the relative values of the gains of the amplifiers 13 and 14, which are so chosen that the output signal of the amplifier 15 brings the distance L to the desired value in the absence of any detectable displacement.

Obviously, this value is so chosen that the followup is stable. The possibility of this adjustment is symbolically represented by the potentiometer 13', which acts on the gain of the amplifier 13. Such a followup adjustment has the advantage of not being destroyed by accidental variations of L, for example of thermal origin. Naturally, the nonzero inoperative or bias value of the output signal resulting therefrom makes it necessary to calculate the utilizable output signal, which is proportional to the measured displacement, from this value.

An important advantage due to the followup control which has been described is the possibility of making a microphone very sensitive not only in the frequency range assigned thereto by the characteristics of inertia, rigidity, etc., of its movable equipment (diaphragm 11 and mirror 9), but also in much wider and readily adjustable ranges. For this purpose, the points of attachment of the cavity 1, which are indicated by arrows in FIGS. 3, 4 and 5, are adjusted.

Figure 3:
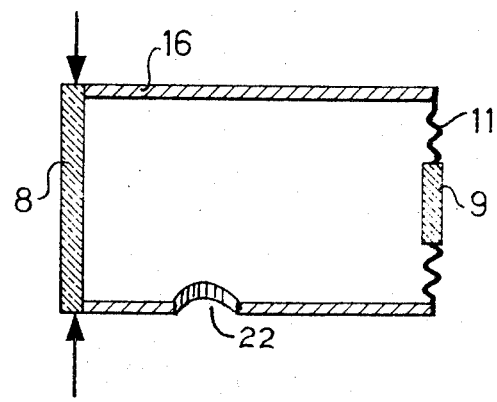
FIGS. 3 to 5 are sectional views of the same cavity employed in microphony.

FIG. 3 corresponds to the case of high acoustic frequencies. When a wave impinges upon the mirror 9, the latter tends to move, for example to be shifted to the left during the compression phase of this wave. Since the cavity 1 is fixed at its upper end, the previously described followup loop, which tends to maintain the distance between the two mirrors, causes the free end of the ceramic element 16 to move towards the right, which tends to minimize the displacement of the mirror 9 by way of the diaphragm 11, and thus reduces its apparent inertia. Since the mass of this mirror has been made small, this results in a considerable improvement in the possibilities of high-frequency response of the microphone thus constructed. It is to be noted that in this case the cavity is not mounted in fluidtight manner but is open to the atmosphere, since the internal pressure of the cavity must remain approximately constant. One opening 22 is shown in FIG. 3.

Figure 4:
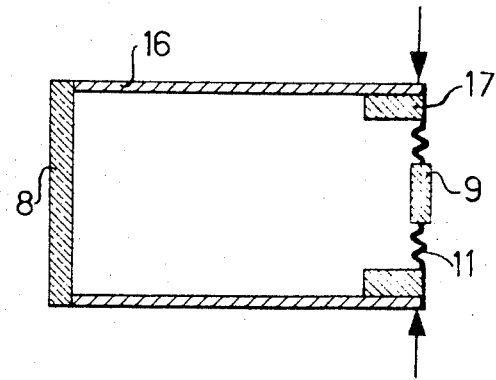

FIG. 4 corresponds to the case of low acoustic frequencies. The ceramic element 16 is fixed at its end on which the diaphragm 11 is mounted. In this case, the latter is advantageously mounted on a support 17 which encroaches upon the internal volume of the cavity 1 so as to minimize the volume displaced by a movement of the mirror 9. When the latter moves to the left under the effect of the incident acoustic wave, the followup shifts the mirror 8 by an almost equal distance in the same direction. Owing to the difference between the volumes displaced by the movement of the mirrors 8 and 9, there is set up in the cavity 1, which is closed or optionally formed with acoustic damping slots, a depression which tends to accentuate the displacement of the mirror 9 to the left, which is opposed by the rigidity of the diaphragm 11. This results in a reduction of the apparent rigidity of the said diaphragm, whereby the possibilities of response to low frequencies are enhanced.

Figure 5:
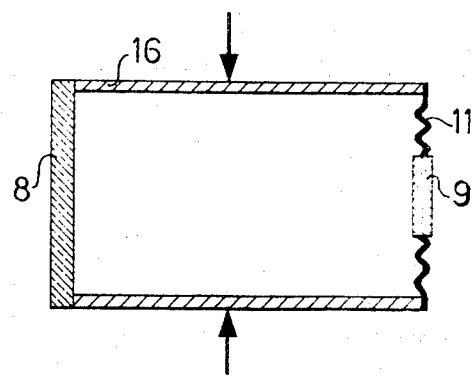

FIG. 5 corresponds to intermediate frequencies, the point of attachment of the ceramic element 16 then being chosen on the length of the latter as a function of the frequency range under consideration, on the lines of the arrangement of FIG. 3 or of that of FIG. 4, depending upon whether higher or lower frequencies are concerned.

The device according to the invention may also constitute an accelerometer which measures the acceleration along the common perpendicular to the mirrors 8 and 9, by the displacement of the suspended mass consisting of the mirror 9, to which there may be attached if necessary an auxiliary mass, and of the resilient suspension means.

Figure 6:
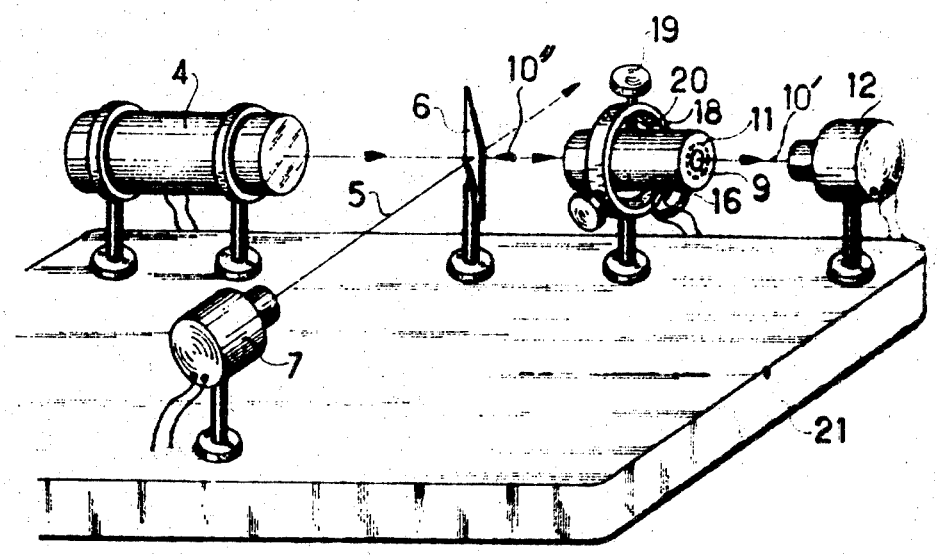
FIG. 6 is a general view of the optical device according to the invention.

The construction of the device for the detection of small displacements according to the invention may comprise, for example (see FIG. 6), a laser 4 of the helium-neon type which gives a light of a wavelength of 6,328 A. with an output energy of several milliwatts. The F.P. cavity 1 is formed of two mirrors having multidielectric layers, only the mirror 9 being shown in the figure. These mirrors are separated by a cylinder 16 consisting of piezoelectric ceramics, having a diameter of the order of a centimeter and a length of a few centimeters. This cylinder is centered and maintained by locking screws such as 20 screwed into a fixed ring 18 and adjustable by means of their heads, such as 19, whereby it is possible to displace the said cylinder in relation to the said ring as a function of the frequency range to be detected.

The optical elements, such as the laser tube 4, the cavity 16, the cell 12 and the semireflecting strip 6 may be mounted on an optical bench 21, for example of marble, and preferably on an antivibration table shielded from atmospheric disturbances.

The signal collected at the output of the differential amplifier may be treated by the methods currently employed by the person skilled in the art.

It is obvious that some embodiments of the present invention have been described by way of nonlimiting illustration and that any modifications of detail may be made therein without departing from its scope or certain means may be replaced by equivalent means. It is notably possible to effect the adjustment of the distance L by applying to the ceramic element 16 a unidirectional voltage obtained from an auxiliary circuit which is separate from the followup loop which has been described. It is also possible, in order to facilitate the processing of the electric signals, to modulate the intensity of the luminous beam emanating from the laser 4, whereby an alternating output signal at the modulation frequency of the light may be obtained. It may be desirable for the said frequency to be very much higher than the frequency of the displacements to be detected and to control the ceramic element 16 only through a rectifying and filtering unit which suppresses this high modulation frequency and leaves only the signal corresponding to the detected displacements.

While the invention has been described with reference to preferred embodiments thereof, it is to be understood that certain changes and modifications may be made by those skilled in the art without departing from the spirit and scope of the invention, except as limited by the appended claims.

What is claimed is:

1. An apparatus for measuring small movements comprising:
   a. a resonant Fabry-Perot cavity including first and second parallel partially reflecting mirrors, said mirrors positioned to be traversed by a beam of monochromatic light from a source directing light into said cavity;
   b. flexible suspension means for suspending said first mirror such that it is movable in a direction along the axis perpendicular to the plane of said second mirror, the movement of said first mirror caused by some external excitation;
   c. a control means for fixedly supporting said second mirror and for controlling the distance between said second mirror and said flexible suspension means;
   d. a photosensitive detector means positioned at the output of said cavity for receiving the light output of said cavity and for producing an electrical output signal in response thereto indicative of the movement of said first mirror; and
   e. a feedback loop means, having an input connected to the output of said photodetector means and having an output connected to said control means, for supplying a signal to said control means in accordance with the output of said photodetector means, whereby the distance between said second mirror and said flexible suspension means tends to be maintained substantially constant.

2. The apparatus of claim 1 wherein said flexible suspension means comprises a membrane, said first mirror suspended in the center thereof.

3. The apparatus of claim 1 wherein said control means comprises a piezoelectric ceramic tube with said second mirror fixedly attached to one end thereof and said flexible suspension means attached to the other end thereof.

4. The apparatus of claim 3 further comprising means attached to said ceramic tube in the plane of said second mirror for causing the end of said ceramic tube attached to said suspension means to move in a direction perpendicular to the plane of said second mirror.

5. The apparatus of claim 4 further comprising means for keeping the interior of said cavity at a constant pressure.

6. The apparatus of claim 3 wherein the surface area of said membrane and said first mirror exposed to said cavity is less than the surface area of said second mirror.

7. The apparatus of claim 3 further comprising means attached to said ceramic tube at the midpoint thereof for limiting the movement of said ceramic tube in a direction perpendicular to the plane of said second mirror.

8. An apparatus for measuring small movements comprising:
  a. a monochromatic light beam source;
  b. a resonant Fabry-Perot cavity including first and second parallel partially reflecting mirrors, said mirrors positioned to be traversed by a first portion of said monochromatic light beam;
  c. flexible suspension means for suspending said first mirror such that it is movable in a direction along the axis perpendicular to the plane of said second mirror, the movement of said first mirror caused by some external excitation;
  d. a control means for fixedly supporting said second mirror and for controlling the distance between said second mirror and said flexible suspension means;
  e. a first photosensitive detector means positioned at the output of said cavity for receiving the light output of said cavity;
  f. a deflector means for deflecting a second portion of said monochromatic light beam;
  g. a second photosensitive detector means for detecting said second portion of said monochromatic light beam;
  h. a comparator means for comparing the output of said first and second photosensitive detector means to provide an output signal indicative of the movement of said first mirror; and
  i. a feedback loop means having an input connected to said comparator means and having an output connected to said control means, for supplying a signal to said control means in accordance with the output of said comparator whereby the distance between said second mirror and said flexible suspension means tends to be maintained substantially constant.

* * * * *